(12) United States Patent
Shoji et al.

(10) Patent No.: US 9,485,909 B2
(45) Date of Patent: Nov. 8, 2016

(54) MOWER AND GRASS MOWING MACHINE INCLUDING THE SAME

(71) Applicant: KUBOTA CORPORATION, Osaka (JP)

(72) Inventors: Yusuke Shoji, Osaka (JP); Satoshi Ogata, Osaka (JP); Akira Minoura, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 282 days.

(21) Appl. No.: 13/971,303

(22) Filed: Aug. 20, 2013

(65) Prior Publication Data

US 2014/0157747 A1 Jun. 12, 2014

(30) Foreign Application Priority Data

Dec. 7, 2012 (JP) .................................. 2012-267873

(51) Int. Cl.
*A01D 67/00* (2006.01)
*A01D 34/71* (2006.01)

(52) U.S. Cl.
CPC .................................... *A01D 34/71* (2013.01)

(58) Field of Classification Search
CPC ........................................................ A01D 34/71
USPC .............................................. 56/320.2, 320.1
See application file for complete search history.

(56) References Cited

U.S. PATENT DOCUMENTS

| | | | |
|---|---|---|---|
| 2,756,556 A * | 7/1956 | Watkins | 56/189 |
| 3,404,519 A * | 10/1968 | Demers | 56/14.7 |
| 3,872,656 A * | 3/1975 | Dahl | 56/202 |
| 4,041,682 A | 8/1977 | Kidd | |
| 5,101,617 A * | 4/1992 | Hare et al. | 56/17.4 |
| 5,195,311 A * | 3/1993 | Holland | 56/320.2 |
| 6,006,506 A | 12/1999 | Dawson | |
| 6,308,503 B1 * | 10/2001 | Scag et al. | 56/6 |
| 6,986,240 B2 | 1/2006 | Kallevig | |
| D556,788 S | 12/2007 | Bucher et al. | |
| 7,328,566 B2 * | 2/2008 | Kallevig | 56/320.2 |
| D565,604 S | 4/2008 | Bucher et al. | |
| 7,458,199 B2 * | 12/2008 | Sarver et al. | 56/320.1 |
| 2004/0231311 A1 * | 11/2004 | Kallevig | A01D 34/82 56/320.2 |
| 2006/0037299 A1 | 2/2006 | Kallevig | |
| 2007/0261380 A1 * | 11/2007 | Bledsoe | 56/320.2 |
| 2009/0031689 A1 * | 2/2009 | Nicholson et al. | 56/320.2 |
| 2009/0031690 A1 * | 2/2009 | Kallevig et al. | 56/320.2 |
| 2009/0301050 A1 * | 12/2009 | Kohler | 56/320.2 |

FOREIGN PATENT DOCUMENTS

JP 2008-278818 11/2008

* cited by examiner

*Primary Examiner* — Thomas B Will
*Assistant Examiner* — Mai Nguyen
(74) *Attorney, Agent, or Firm* — Greenblum & Bernstein, P.L.C.

(57) ABSTRACT

There is provided a mower in which a guide member does not easily protrude on the side of the mower, and a grass mowing machine including the same. A mower for discharging mowed grasses from a discharge port provided in a side part of a mower deck to an exterior of the mower deck includes a flexible rubber sheet formed in a flat plate shape, a pivot frame, support frames, and a pivot shaft for attaching the rubber sheet to the mower deck oscillatably in the up and down direction, and fixing members for fixing the rubber sheet to the mower deck in a state that the rubber sheet is bent into a shape capable of guiding the mowed grasses discharged from the discharge port.

15 Claims, 14 Drawing Sheets

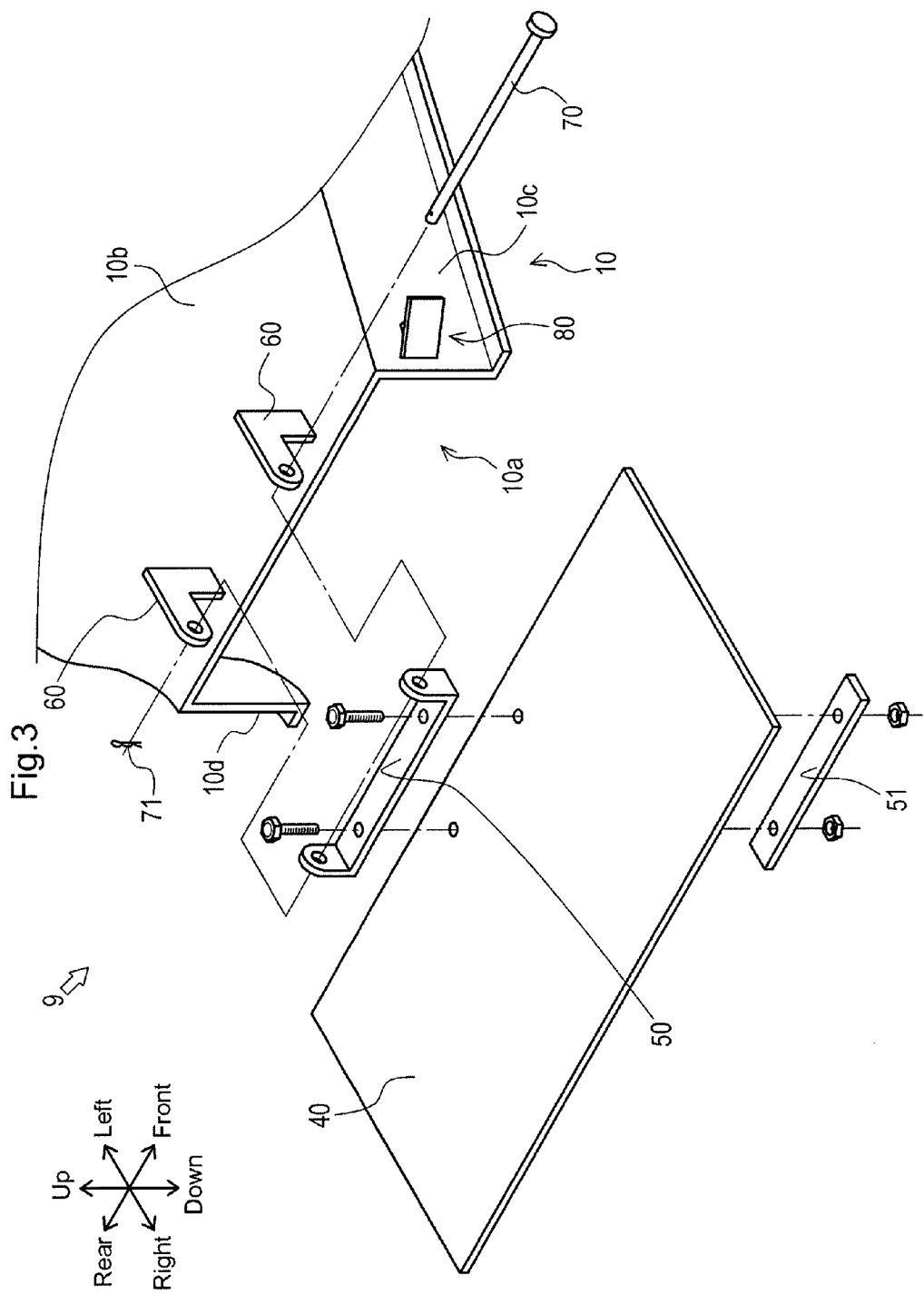

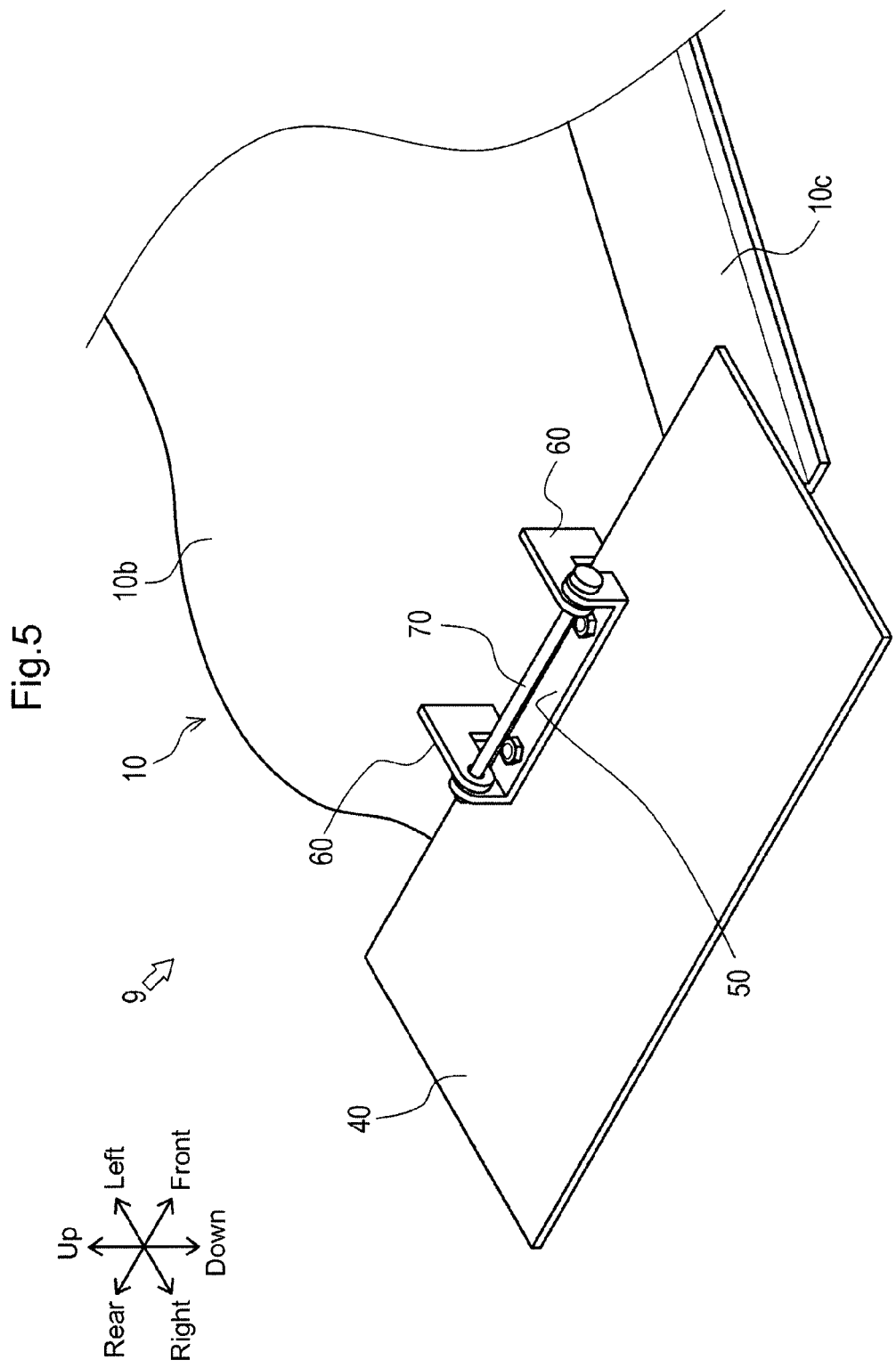

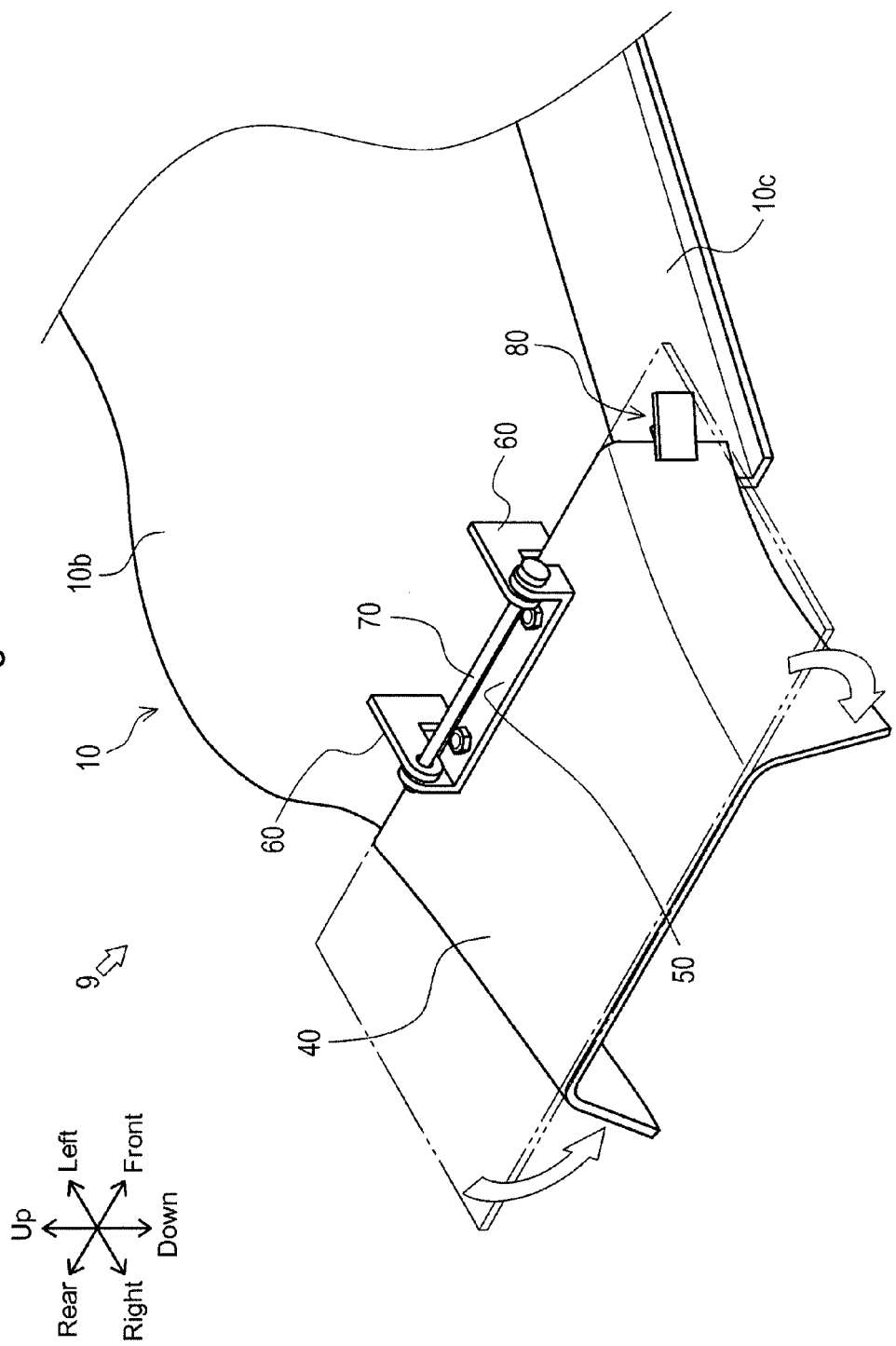

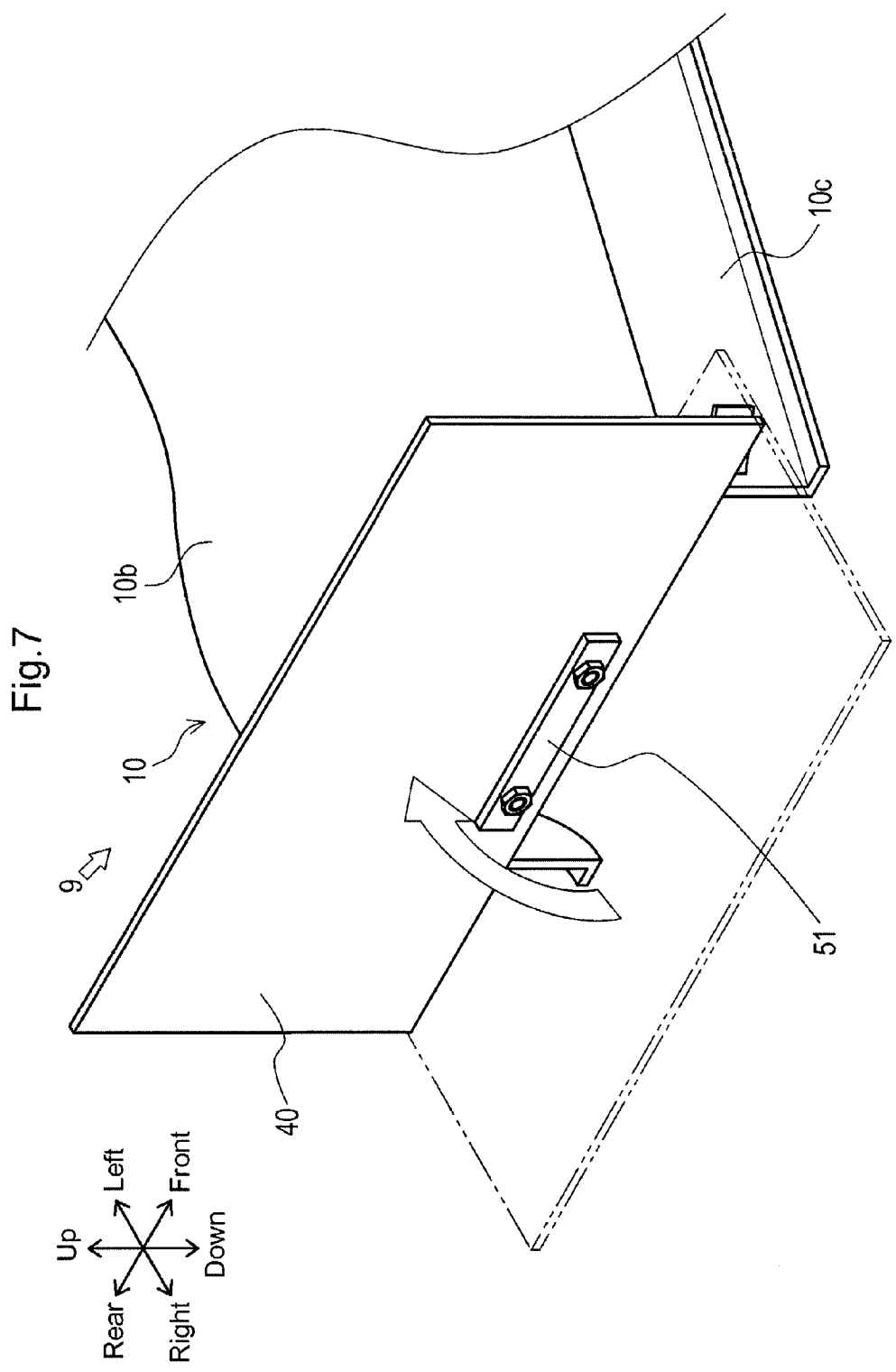

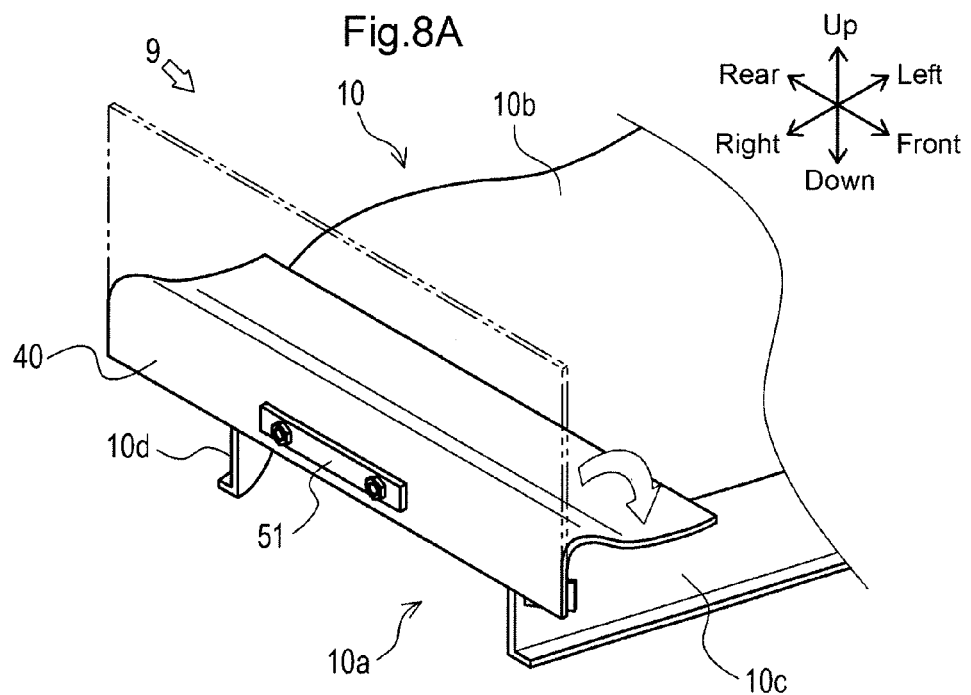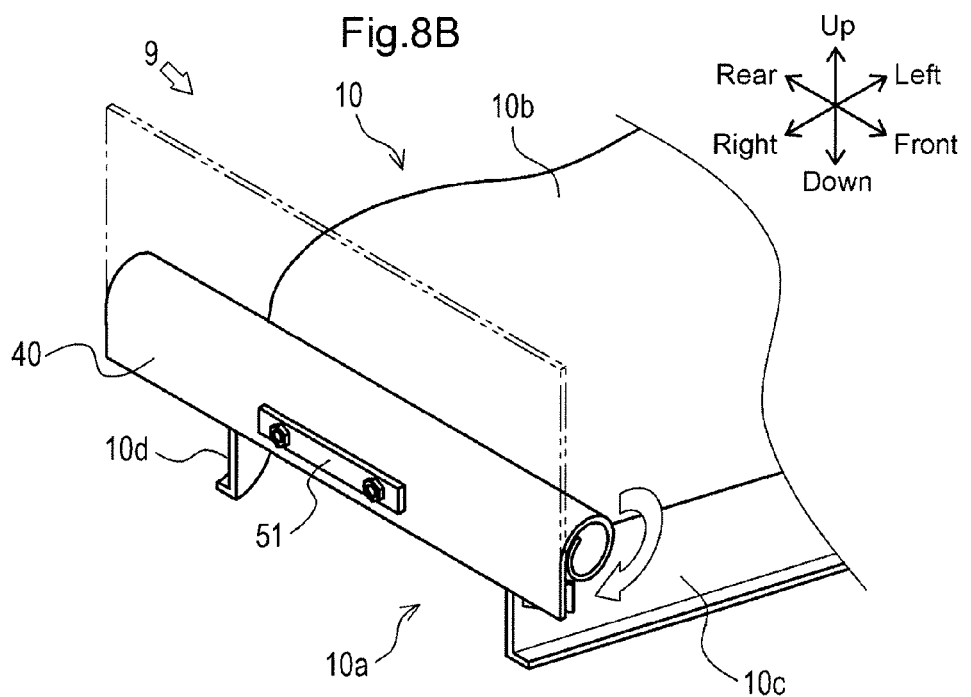

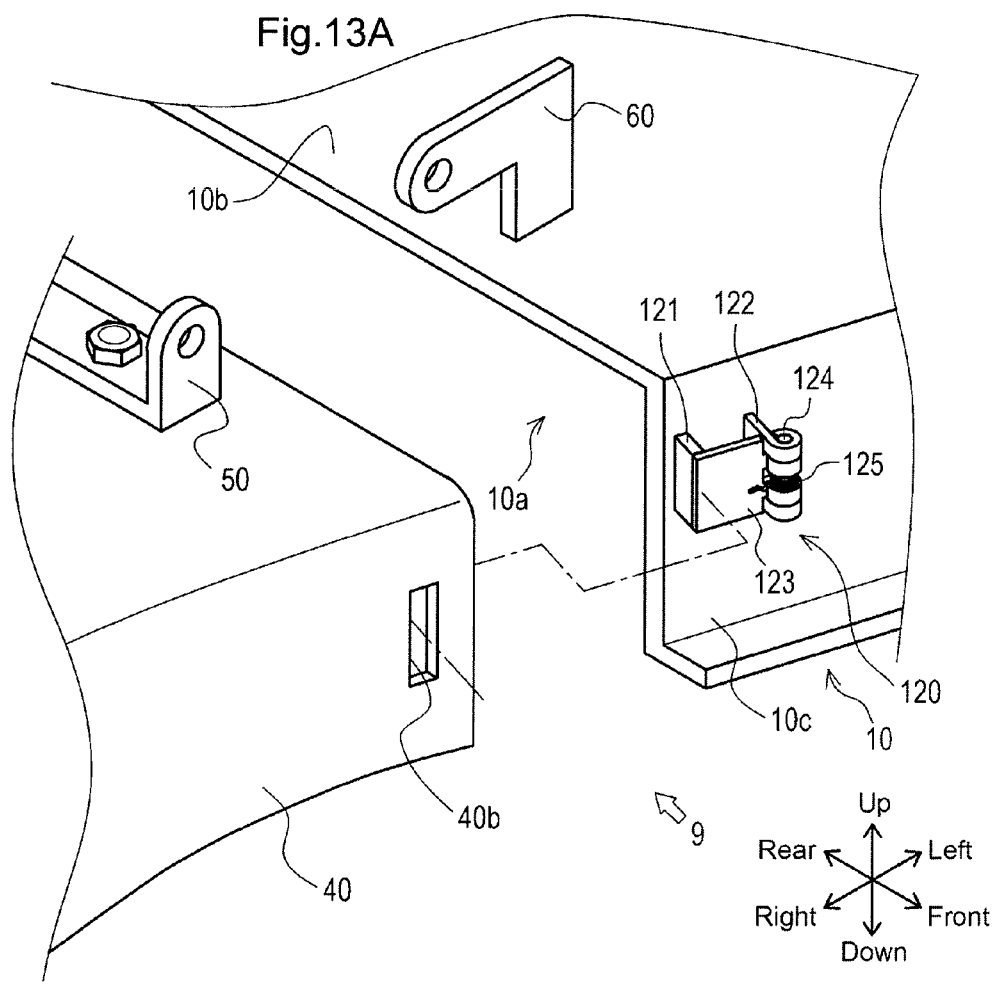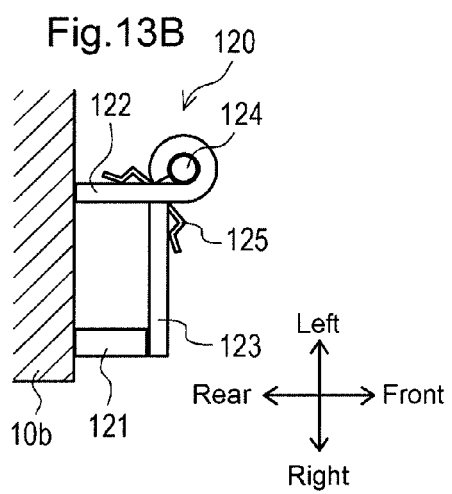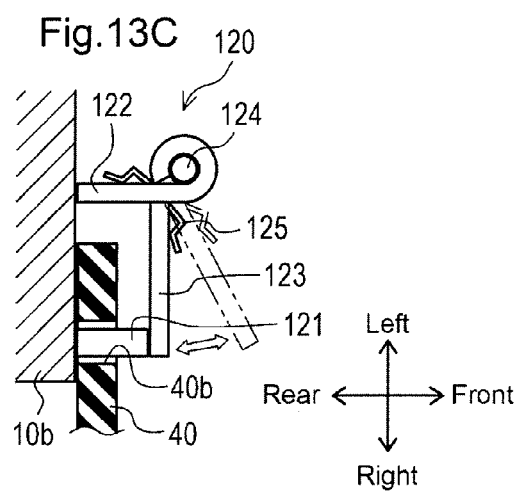

MOWER AND GRASS MOWING MACHINE INCLUDING THE SAME

BACKGROUND OF THE INVENTION (1) Field of the Invention

The present invention relates to a technique of a mower for discharging mowed grasses from a discharge port provided in a side part of a mower deck to an exterior of the mower deck, and a grass mowing machine including the same.

(2) Description of Related Art

Conventionally, there is a known technique of a mower for discharging mowed grasses from a discharge port provided in a side part of a mower deck to an exterior of the mower deck. For example, the technique is as described in Japanese Unexamined Patent Application Publication No. 2008-278818.

The technique described in Japanese Unexamined Patent Application Publication No. 2008-278818 is a mower in which a discharge port for discharging grasses mowed by rotary blades is provided in a side part of a mower deck, a guide member for guiding the mowed grasses from the discharge port to the laterally outer side is provided, the guide member is formed in such a manner that a posture is changeable to a standing posture of standing and a folding posture of folding, and a retaining mechanism for retaining the guide member at the standing posture is provided.

In the mower formed in such a way, by retaining the guide member at the standing posture, the guide member does not easily protrude to the laterally outer side of the mower deck. Thereby, at the time of performing a mulching task (mowing task performed without discharging the mowed grasses to the laterally outer side of the mower deck), the grasses can be easily mowed with the mower deck moved against a wall or the like, so that workability can be improved. In a case where a grass mowing machine provided with the mower is conveyed or stored in a garage, a space can be saved.

However, generally in the mower as described in Japanese Unexamined Patent Application Publication No. 2008-278818, the guide member is molded by a material which is not easily elastically deformed such as resin and iron. The guide member is formed by a top plate and side plates standing downward from the top plate in order to guide the mowed grasses. Therefore, even when the guide member is retained at the standing posture, a side plate part of the guide member protrudes to the laterally outer side of the mower. Thus, disadvantageously, there is a fear that a part (side plate part) of the guide member is brought into contact with an obstacle and the like at the time of working, conveying, storing, or the like.

SUMMARY OF THE INVENTION

The present invention has been made in consideration with the above circumstances, and an object thereof is to provide a mower in which a guide member does not easily protrude to the side of the mower, and a grass mowing machine including the same.

The object of the present invention is described above, and next, means for achieving this object will be described.

Specifically, a first aspect of the present invention provides a mower for discharging mowed grasses from a discharge port provided in a side part of a mower deck to an exterior of the mower deck, the mower including a flexible guide member formed in a flat plate shape, a coupling assembly for attaching the guide member to the mower deck oscillatably in the up and down direction, and a fixing member for fixing the guide member to the mower deck in a state that the guide member is bent into a shape capable of guiding the mowed grasses discharged from the discharge port.

According to a second aspect, the mower further includes a retaining member for retaining the guide member whose fixing by the fixing member is released in a state that the guide member is oscillated upward.

A third aspect provides a grass mowing machine including the mower according to the first aspect or the second aspect.

As effects of the present invention, the following effects will be obtained.

In the first aspect, by releasing the fixing of the guide member, the shape of the guide member can be returned from a shape of guiding the mowed grasses to a flat plate shape. Thereby, the guide member cannot easily protrude to the side of the mower.

In the second aspect, the guide member can be retained in a state that the guide member does not easily protrude to the side of the mower.

In the third aspect, by releasing the fixing of the guide member, the shape of the guide member can be returned from a shape of guiding the mowed grasses to a flat plate shape. Thereby, the guide member cannot easily protrude to the side of the mower.

BRIEF DESCRIPTION OF THE DRAWINGS

FIG. 3 is an exploded perspective view of a right end of the mower;

FIG. 5 is a perspective view showing a state that the rubber sheet is assembled to the right end of the mower;

FIG. 6 is a perspective view showing the rubber sheet in a working state;

FIG. 7 is a perspective view showing a state that the rubber sheet is oscillated upward;

FIG. 8A is a perspective view showing one example of the rubber sheet in an accommodation state, and FIG. 8B is a perspective view showing another example of the rubber sheet in the accommodation state;

FIG. 13A is a perspective view showing a state that the rubber sheet is fixed by a fixing member according to a sixth embodiment, FIG. 13B is a partially sectional plan view showing the fixing member, and FIG. 13C is a partially sectional plan view showing the fixing member in a state that the rubber sheet is fixed.

DETAILED DESCRIPTION OF PREFERRED EMBODIMENTS

In the following description, the directions shown by arrows in the figures are respectively defined as the up and down direction, the front and rear direction, and the left and right direction.

Figure 1:
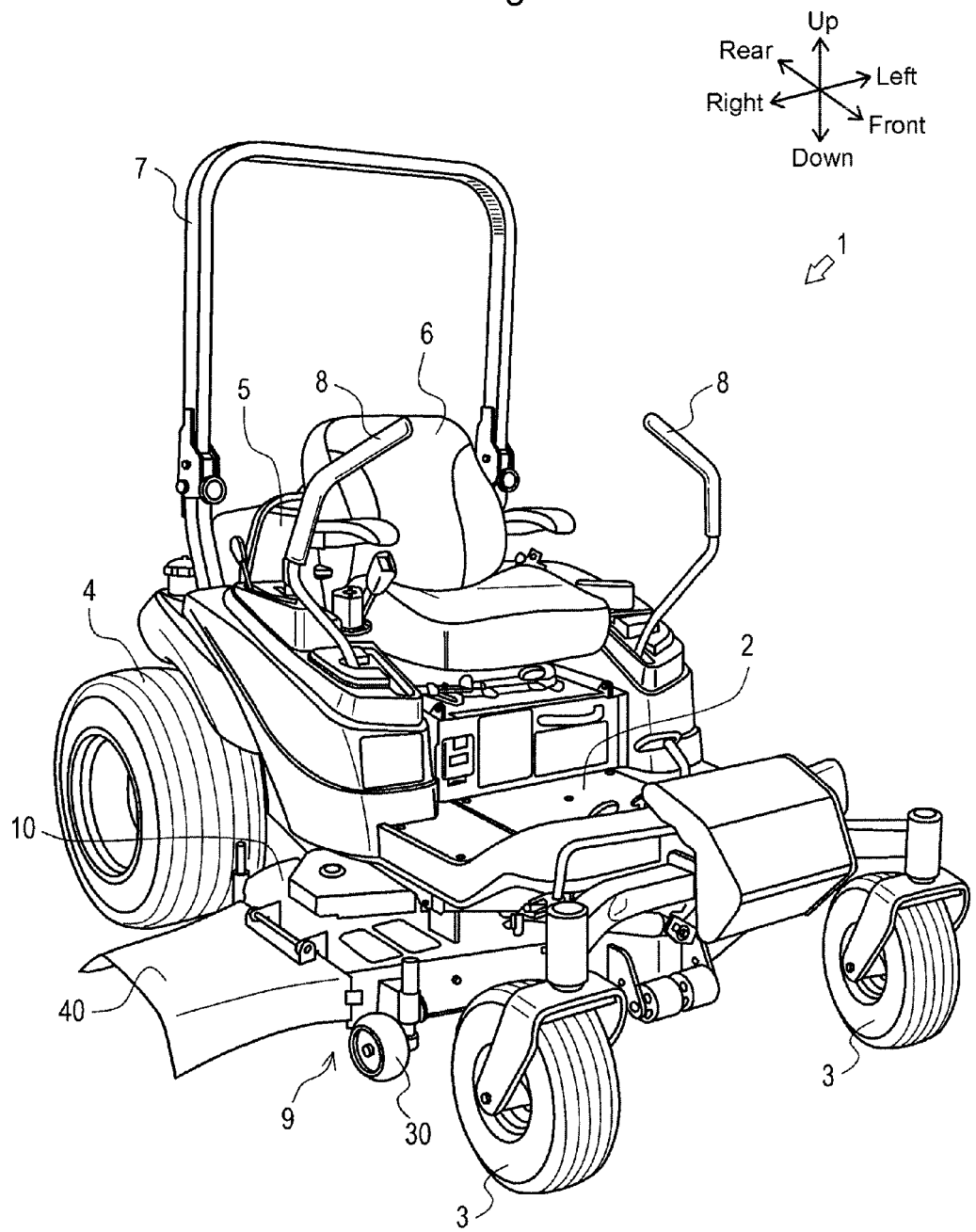
FIG. 1 is a perspective view of a grass mowing machine including a mower according to one embodiment of the present invention.

Firstly, with reference to FIG. 1, a description will be given of the entire configuration of a grass mowing machine 1 including a mower 9 according to one embodiment (first embodiment) of a mower of the present invention.

The grass mowing machine 1 mainly includes a traveling vehicle body 2, front wheels 3, drive wheels 4, an engine 5, a driver's seat 6, a rollover protection frame 7, traveling levers 8, 8, and the mower 9.

A front part of the traveling vehicle body 2 is supported by the pair of left and right front wheels 3, 3 serving as driven wheels (non-drive wheels). A rear part of the traveling vehicle body 2 is supported by the pair of left and right drive wheels 4 (the left drive wheel is not shown). The engine 5 is provided in the rear part of the traveling vehicle body 2.

The driver's seat 6 onto which a worker is seated is provided on the front side of the engine 5. The rollover protection frame 7 for protecting the worker is provided on the rear side of the driver's seat 6. The pair of left and right traveling levers 8, 8 is provided on the left and right sides of the driver's seat 6. The mower 9 is provided in a center lower part (between the front wheels 3 and the drive wheels 4) of the traveling vehicle body 2 via a link mechanism (not shown).

Motive power of the engine 5 is transmitted to a pair of left and right transmission device (not shown) provided respectively corresponding to the drive wheels 4, 4 via a motive power transmission mechanism (not shown). The worker can respectively perform a transmission operation of the pair of left and right transmission devices by operating the traveling levers 8, 8, so as to respectively independently and arbitrarily drive the drive wheels 4, 4. In such a way, by operating the traveling levers 8, 8, the grass mowing machine 1 can be moved forward and rearward or turned.

Further, the motive power of the engine 5 is transmitted to the mower 9 via the motive power transmission mechanism (not shown). By the motive power, the mower 9 can perform a mowing task.

Next, the configuration of the mower 9 will be described with reference to FIGS. 2 to 4D.

The mower 9 is a working machine for mowing grasses grown on the lower side thereof in such a manner that the grasses have a predetermined length (height). The mower 9 mainly includes a mower deck 10, rotary blades 20, idling wheels 30, 30, . . . , a rubber sheet 40, a pivot frame 50, support frames 60, 60, a pivot shaft 70, and fixing clips 80, 80.

Figure 2:
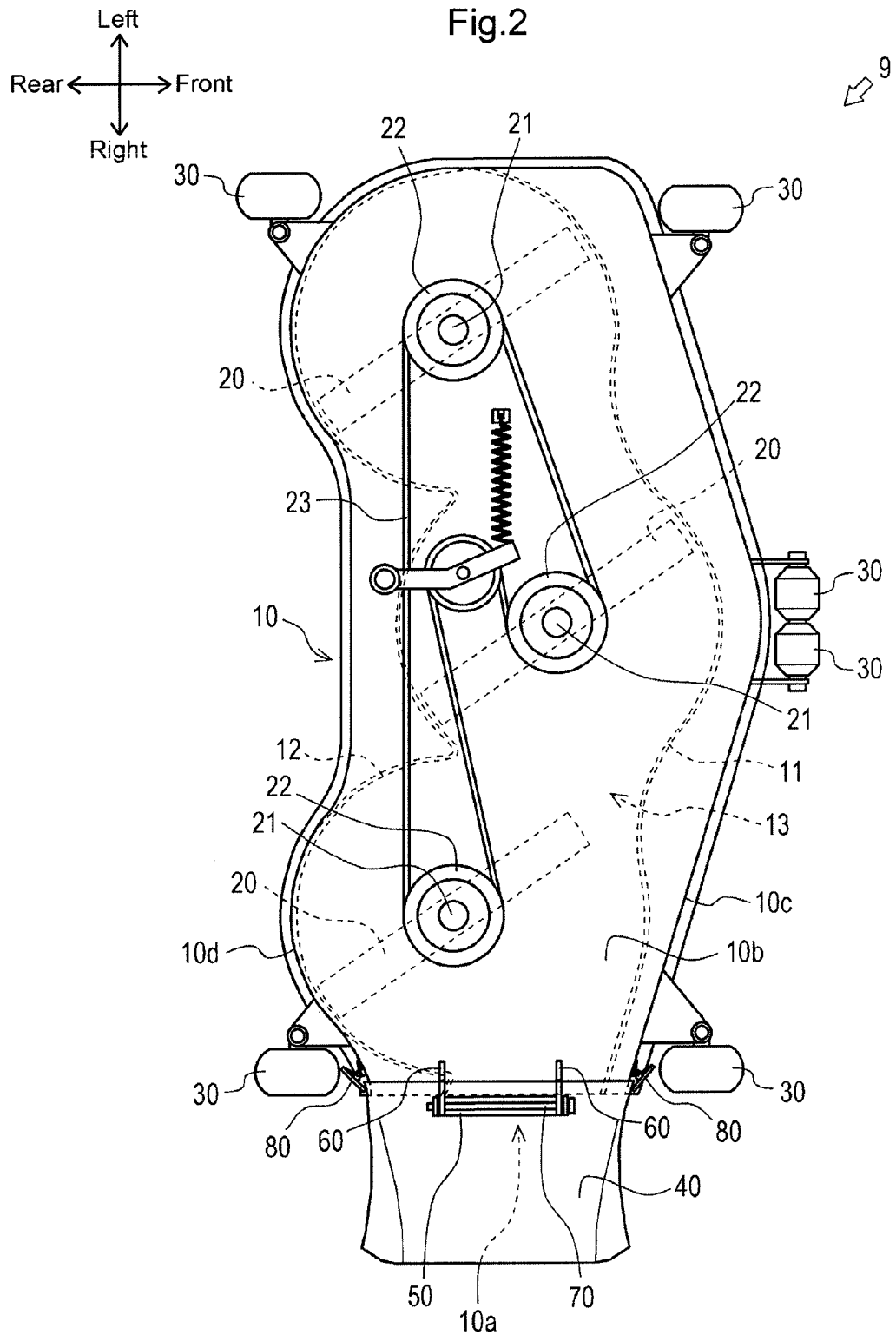
FIG. 2 is a plan view of the mower.

The mower deck 10 shown in FIGS. 2 and 3 serves as a major structural body of the mower 9. The mower deck 10 is formed into a box shape of a substantially rectangular shape when seen in a plan view and arranged in such a manner that the longitudinal direction thereof is in the left and right direction. A lower surface of the mower deck 10 is opened. A discharge port 10a is formed in the mower deck 10. The mower deck 10 includes a front vacuum plate 11 and a rear vacuum plate 12.

The discharge port 10a is to discharge the mowed grasses. The discharge port 10a is provided in a right side part of the mower deck 10. The discharge port 10a is formed by opening a right side surface of the mower deck 10. More specifically, the discharge port 10a is formed by a top plate 10b, a front side plate 10c, and a rear side plate 10d.

The top plate 10b forms an upper surface of the mower deck 10. The top plate 10b is formed into a flat plate shape.

The front side plate 10c forms a side surface on a front side of the mower deck 10. The front side plate 10c is formed by bending appropriately. The front side plate 10c is fixed to the top plate 10b so as to be along a front end of the top plate 10b.

The rear side plate 10d forms a side surface on a rear side of the mower deck 10. The rear side plate 10d is formed by bending appropriately. The rear side plate 10d is fixed to the top plate 10b so as to be along a rear end of the top plate 10b.

A part surrounded by right ends of the top plate 10b, the front side plate 10c, and the rear side plate 10d serves as the discharge port 10a.

The front vacuum plate 11 shown in FIG. 2 is a plate-like member standing downward in the mower deck 10. The front vacuum plate 11 is formed by bending appropriately. The front vacuum plate 11 is arranged in the vicinity of a front end in the mower deck 10.

The rear vacuum plate 12 is a plate-like member standing downward in the mower deck 10. The rear vacuum plate 12 is formed by bending appropriately. The rear vacuum plate 12 is arranged in the vicinity of a rear end in the mower deck 10.

A shredding chamber 13 serving as a space for shredding the mowed grasses is formed between the front vacuum plate 11 and the rear vacuum plate 12.

The rotary blades 20, 20, . . . are to mow the grasses. The three rotary blades 20, 20, . . . are arranged side by side in the substantially left and right direction in the shredding chamber 13. The rotary blades 20, 20, . . . are coupled to rotation shafts 21, 21, . . . , pulleys 22, 22, . . . , and a belt 23.

The rotation shafts 21, 21, . . . are shafts at the time of rotating the rotary blades 20, 20, . . . . The rotation shafts 21, 21, . . . are respectively arranged in a state that the longitudinal direction thereof is in the up and down direction. The rotary blades 20, 20, . . . are respectively fixed to lower ends of the rotation shafts 21, 21, . . . . Upper ends of the rotation shafts 21 are inserted into the top plate 10b of the mower deck 10 and rotatably supported by the top plate 10b.

The pulleys 22, 22, . . . are to transmit the motive power to the rotation shafts 21, 21, . . . . The three pulleys 22, 22, . . . are respectively fixed to the upper ends of the rotation shafts 21, 21, . . . . The remaining one pulley 22 is arranged at a predetermined position in a state that the pulley is biased in the predetermined direction.

The belt 23 is to transmit the motive power to the rotation shafts 21, 21, . . . . The belt 23 is looped over the pulleys 22, 22, . . . .

In the above configuration, the motive power from the engine 5 (see FIG. 1) is transmitted to one of the pulleys 22 (the pulley 22 fixed to the center rotation shaft 21 in the present embodiment) via the motive power transmission mechanism (not shown). The motive power is transmitted to all the pulleys 22, 22, . . . via the belt 23, and the pulleys 22, 22, . . . are rotated in the same direction as each other (clockwise when seen in a plan view in the present embodiment). When the pulleys 22, 22, . . . are rotated, the rotary blades 20, 20, . . . are rotated in the same direction as each other via the rotation shafts 21, 21, . . . respectively fixed to the pulleys 22, 22, . . . .

By rotating the rotary blades 20, 20, . . . and bringing the rotary blades 20, 20, . . . into contact with the grasses on the lower side of the mower 9, the grasses can be mowed. The mowed grasses are moved rightward in the shredding chamber 13 by rotation of the rotary blades 20, 20, . . . , and discharged from the discharge port 10a to an exterior of the mower deck 10.

The idling wheels 30, 30, . . . are wheels for supporting the mower deck 10 from the lower side. The idling wheels 30, 30, . . . are respectively provided at four corners of the mower deck 10 and on left and right centers of the front end. By rolling the idling wheels 30, 30, . . . along inclination or bumps of the ground, the mower deck 10 can be displaced in the up and down direction so as to follow the ground.

It should be noted that for convenience of description, in FIGS. 3, 5 to 9, and 11A to 13C, the front vacuum plate 11, the rear vacuum plate 12, the rotary blades 20, the rotation shafts 21, the pulleys 22, the belt 23, and the idling wheels 30 are not shown.

The rubber sheet 40 shown in FIGS. 2 and 3 is to guide the mowed grasses discharged from the discharge port 10a to the exterior of the mower deck 10 in the predetermined direction. The rubber sheet 40 is formed by using highly flexible (easily elastically deformable) rubber. The rubber sheet 40 is formed into a substantially rectangular shape when seen in a plan view. The rubber sheet 40 is formed so as to have a thickness of such an extent that the rubber sheet can be warped (elastically deformed) by applying a force from the exterior.

In the present embodiment, the rubber sheet 40 is used as a guide member according to the present invention.

The pivot frame 50 is to support the rubber sheet 40. The pivot frame 50 is formed by using a substantially rectangular plate-like member arranged in such a manner that the longitudinal direction thereof is in the front and rear direction. The pivot frame 50 is formed by respectively bending a front end and a rear end of the substantially rectangular plate-like member upward. In a front end and a rear end (bent parts) of the pivot frame 50, through holes passing through the parts in the front and rear direction are formed on the same axis. A front-rear length of the pivot frame 50 is formed to be shorter than a front-rear length of the discharge port 10a of the mower deck 10.

A front-rear center part of the pivot frame 50 is fixed to a vicinity part of a left end of the rubber sheet 40. More specifically, the pivot frame 50 is fixed to a fixing plate 51 by a bolt and a nut in a state that the vicinity part of the left end of the rubber sheet 40 is nipped between the pivot frame and the substantially rectangular plate-like fixing plate 51 arranged on the lower side of the pivot frame 50. Thereby, the pivot frame 50 is fixed to the rubber sheet 40.

The support frames 60, 60 are to pivotably support the pivot frame 50 with respect to the mower deck 10. The support frame 60 is formed by a plate-like member formed into a substantially L shape when seen in a front view, the member having a base end extended in the up and down direction, and a leading end extended rightward from an upper end of the base end. The support frames 60, 60 are arranged side by side in the front and rear direction. The support frames 60, 60 are arranged in such a manner that a distance between the support frames is the substantially same as the front-rear length of the pivot frame 50. The base ends of the support frames 60, 60 are respectively fixed to a vicinity part of the right end of the mower deck 10 (top plate 10b). In the leading ends of the support frames 60, 60, through holes passing through the leading ends in the front and rear direction are respectively formed on the same axis.

The pivot shaft 70 is to couple the pivot frame 50 to the support frames 60, 60. The pivot shaft 70 is arranged in such a manner that the longitudinal direction thereof is in the front and rear direction. In a front end of the pivot shaft 70, a head part whose diameter is larger than the through holes of the support frames 60, 60 and the pivot frame 50 is formed. The pivot shaft 70 is inserted into the through holes of the support frames 60, 60 and the pivot frame 50 from the front side in a state that the pivot frame 50 is arranged between the support frames 60, 60. Thereby, the pivot shaft 70 couples the pivot frame 50 to the support frames 60, 60 oscillatably (pivotably) in the up and down direction. A pin 71 is fixed to a rear end of the pivot shaft 70. The pivot shaft 70 is prevented from dropping off in the front and rear direction by the head part and the pin 71.

In the present embodiment, as a coupling assembly according to the present invention, the pivot frame 50, the support frames 60, and the pivot shaft 70 are used.

The fixing clips 80, 80 shown in FIGS. 2 to 4D are to fix the rubber sheet 40 to the mower deck 10. One of the fixing clips 80, 80 is provided in a front part (front side plate 10c) and the other is provided in a rear part (rear side plate 10d) of the mower deck 10. Since the configurations of the two fixing clips 80, 80 are the same, the fixing clip 80 arranged on the front side will be described below, and description of the fixing clip 80 arranged on the rear side will be omitted.

Figure 4A:
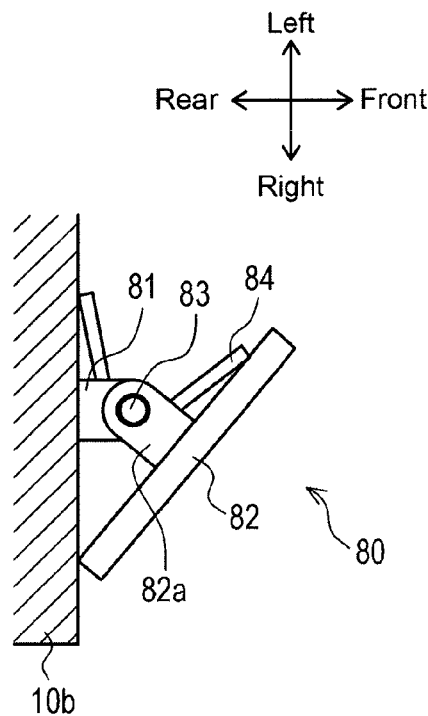
FIG. 4A is a plan view of a fixing clip.
Figure 4B:
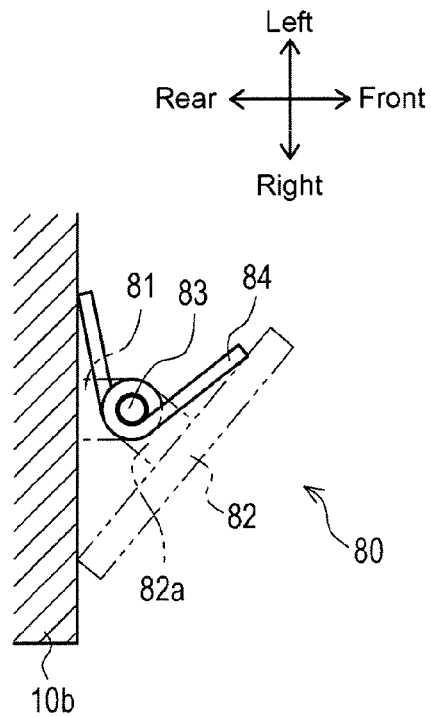
FIG. 4B is a partially transparent plan view of the fixing clip.
Figure 4C:
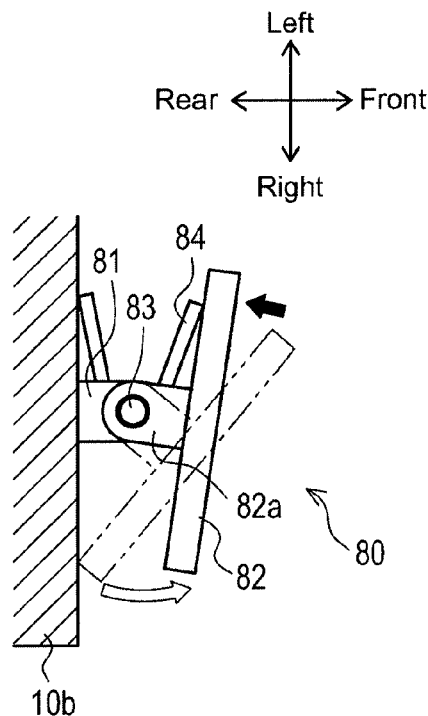
FIG. 4C is a plan view showing a state that a movable plate of the fixing clip is pivoted.
Figure 4D:
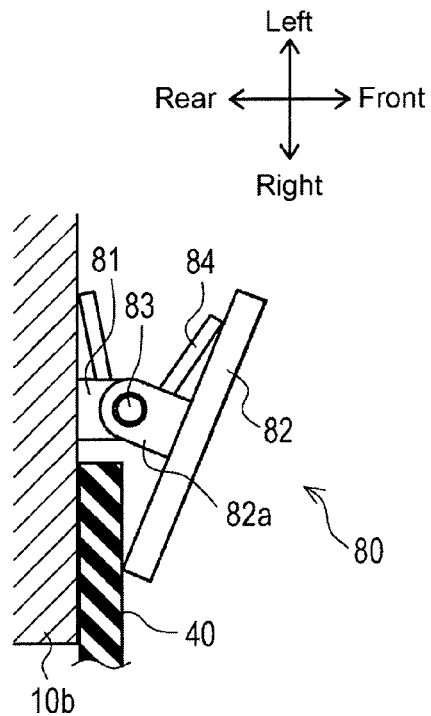
FIG. 4D is a plan view showing a state that a rubber sheet is fixed by the fixing clip.

The fixing clip 80 shown in FIGS. 3 to 4D is provided in the vicinity of a front end of a front surface of the front side plate 10c. The fixing clip 80 mainly includes support plates 81, a movable plate 82, a pivot shaft 83, and a spring 84.

The pair of upper and lower support plates 81, 81 is provided in a state that plate surfaces thereof face the up and down direction. The support plates 81, 81 are fixed to a vicinity part of a front end of the front side plate 10c of the mower deck 10.

The movable plate 82 is a plate-like member pivotably coupled to the support plates 81, 81. The movable plate 82 is arranged in such a manner that plate surfaces thereof face the substantially front and rear direction. The movable plate 82 includes coupling plates 82a, 82a.

The pair of upper and lower coupling plates 82a, 82a is provided in a state that plate surfaces thereof face the up and down direction. The coupling plates 82a, 82a are fixed to a rear side surface of the movable plate 82.

The pivot shaft 83 is to couple the movable plate 82 to the support plates 81, 81. The pivot shaft 83 is arranged in such a manner that the longitudinal direction thereof is in the up and down direction. The pivot shaft 83 is inserted into through holes formed in the coupling plates 82a, 82a of the movable plate 82 and the support plates 81. Thereby, the pivot shaft 83 couples the movable plate 82 to the support plates 81, 81 oscillatably (pivotably) in the front and rear direction.

The spring 84 is to bias the movable plate 82 in one direction. The spring 84 is arranged between the front side plate 10c of the mower deck 10 and the movable plate 82. The spring 84 biases the movable plate 82 clockwise when seen in a plan view. Thereby, unless an external force is applied, a right end of the movable plate 82 is retained in a state that the right end is pushed to the front side plate 10c of the mower deck 10.

The same fixing clip 80 as the above description is also provided in the vicinity of a front end of a rear surface of the rear side plate 10d.

In the present embodiment, as a fixing member according to the present invention, the fixing clips 80 are used.

Next, with reference to FIGS. 4A to 8B, a state that the rubber sheet 40 is changed to a "working state" or an "accommodation state" in the mower 9 formed as above will be described.

The "working state" indicates a state that the rubber sheet 40 guides the mowed grasses discharged from the discharge port 10a to the exterior of the mower deck 10 in the predetermined direction.

In a case of bringing the rubber sheet 40 into the working state, firstly as shown in FIG. 5, the rubber sheet 40 is oscillated downward so that plate surfaces of the rubber sheet 40 become substantially horizontal.

Next, as shown in FIG. 6, both front and rear ends of the rubber sheet 40 are bent downward so as to be along the discharge port 10a of the mower deck 10. Thereby, the discharge port 10a is covered by the rubber sheet 40 from the upper, front, and rear sides.

Finally, left ends of both the front and rear ends (downward-bent part) of the rubber sheet 40 are fixed to the mower deck 10 by the fixing clips 80, 80.

Specifically, as shown in FIG. 4C, a left end of the movable plate 82 is pressed rearward and the movable plate 82 is pivoted anticlockwise when seen in a plan view against a bias force of the spring 84. Thereby, the right end of the movable plate 82 and the mower deck 10 (front side plate 10c) are separated. Next, as shown in FIG. 4D, the rubber sheet 40 is inserted between the right end of the movable plate 82 and the mower deck 10, so that pressing of the movable plate 82 is released. Thereby, the movable plate 82 is pivoted clockwise when seen in a plan view again by the bias force of the spring 84, so that the rubber sheet 40 is nipped by the right end of the movable plate 82 and the mower deck 10. Thereby, the rubber sheet 40 is fixed to the mower deck 10.

The rubber sheet 40 brought into the working state in such a way is retained in a state that the rubber sheet is formed into a shape along the discharge port 10a of the mower deck 10, that is, a substantially tubular shape with an upper side, a pair of spaced-apart opposite sides and an open bottom (see FIG. 6). The rubber sheet 40 in the working state can guide the mowed grasses discharged from the discharge port 10a to the exterior of the mower deck 10 further rightward, and discharge from the right end of the rubber sheet 40 to the exterior.

The rubber sheet 40 is flexible. Thus, even when the rubber sheet 40 is brought into contact with an obstacle during traveling of the grass mowing machine 1 (during a mowing task), the rubber sheet 40 is appropriately warped and the obstacle is not damaged. The rubber sheet 40 itself is not broken.

The "accommodation state" is a state that the rubber sheet 40 is accommodated so as not to easily protrude to the right outer side of the mower deck 10.

In a case of bringing the rubber sheet 40 into the accommodation state, firstly as shown in FIG. 7, the rubber sheet 40 is oscillated upward so that the plate surfaces of the rubber sheet 40 become substantially vertical.

Next, as shown in FIGS. 8A and 8B, the rubber sheet 40 is folded so that the rubber sheet 40 does not easily protrude to the right outer side of the mower deck 10.

Specifically, for example as shown in FIG. 8A, an upper end of the rubber sheet 40 is bent leftward, and the upper end of the rubber sheet 40 is mounted on an upper part of the mower deck 10.

Alternatively, for example as shown in FIG. 8B, the rubber sheet 40 is rolled up from the upper end side of the rubber sheet 40 to the lower side. The upper end side of the rolled rubber sheet 40 is mounted on the upper part of the mower deck 10.

The rubber sheet 40 brought into the accommodation state in such a way does not easily protrude to the right outer side of the mower deck 10. Particularly, in the accommodation state, the shape of the rubber sheet 40 (substantially tubular shape) in the working state is not retained. Thus, the rubber sheet can less easily protrude to the right outer side of the mower deck 10. Since the rubber sheet 40 does not easily protrude to the right outer side of the mower deck 10 in such a way, a space can be saved in the mower 9.

Particularly, in a case where the mower 9 is detached from the grass mowing machine 1, by mounting the rubber sheet 40 on the upper part of the mower deck 10 as shown in FIGS. 8A and 8B, a space can be saved at the time of accommodating or conveying a single body of the mower 9.

As described above, the mower 9 according to the present embodiment is the mower 9 for discharging the mowed grasses from the discharge port 10a provided in the side part of the mower deck 10 to the exterior of the mower deck 10, the mower 9 including the flexible rubber sheet 40 (guide member) formed in a flat plate shape, the pivot frame 50, the support frames 60, and the pivot shaft 70 (coupling assembly) for attaching the rubber sheet 40 to the mower deck 10 oscillatably in the up and down direction, and the fixing clips 80 (fixing member) for fixing the rubber sheet 40 to the mower deck 10 in a state that the rubber sheet 40 is bent into a shape capable of guiding the mowed grasses discharged from the discharge port 10a.

With such a configuration, by releasing fixing of the rubber sheet 40, the shape of the rubber sheet 40 can be returned from a shape of guiding the mowed grasses to a flat plate shape. Thereby, the rubber sheet 40 cannot easily protrude to the side of the mower 9.

By inclining the rubber sheet 40 to the inner side (side of the traveling vehicle body 2 with respect to the grass mowing machine 1) (see FIG. 8A) or rolling up the rubber sheet 40 (see FIG. 8B), a space can be more saved in the mower 9.

By forming the member for guiding the mowed grasses by the rubber sheet 40 in such a way, there is no need for complicated molding, so that manufacturing cost can be reduced.

Since the rubber sheet 40 itself is formed in a flat plate shape, the rubber sheet 40 itself can be compactly formed.

Figure 9:
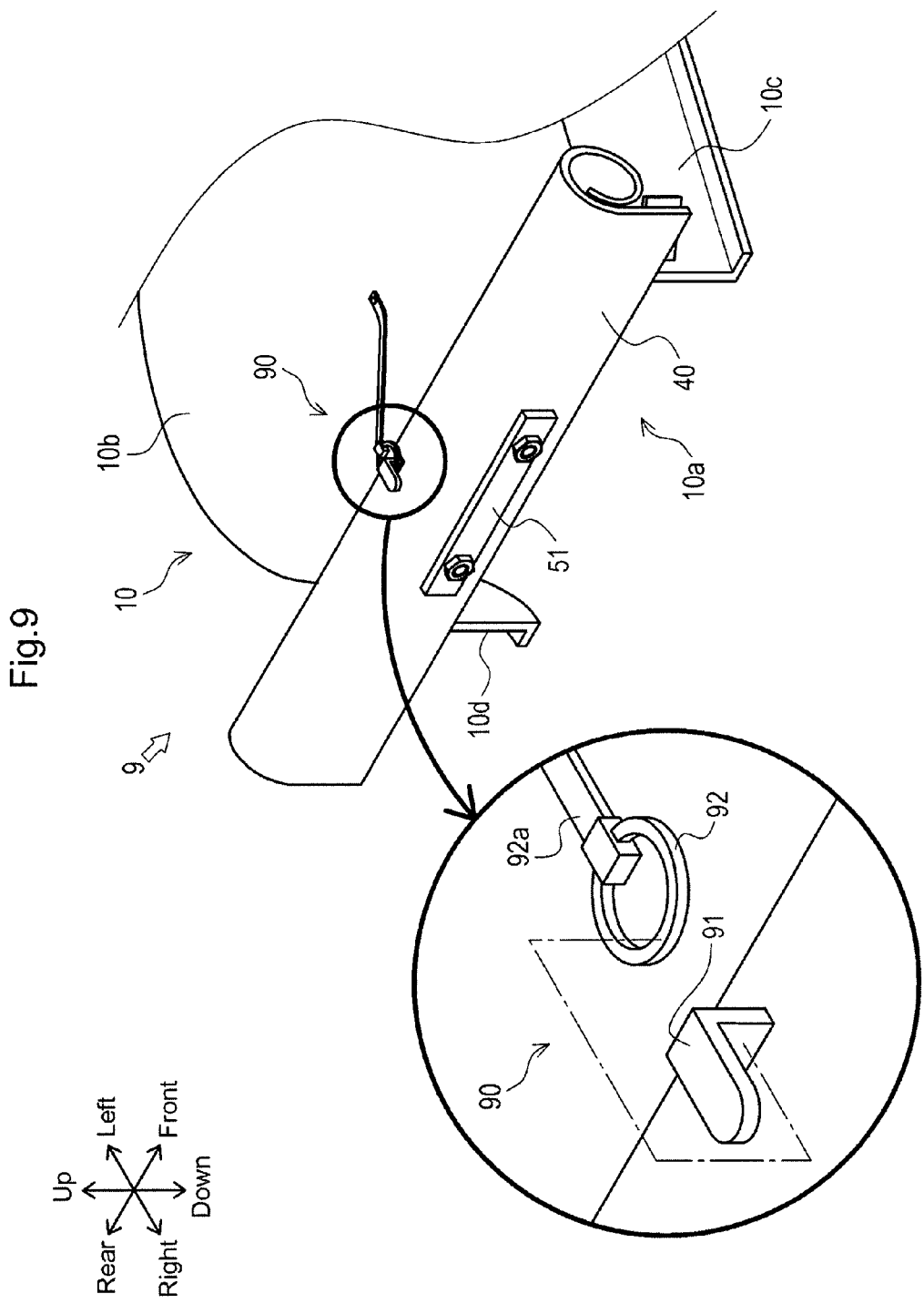
FIG. 9 is a perspective view showing a state that the rubber sheet in a rolled-up state is retained by a retaining member according to a second embodiment.

Hereinafter, with reference to FIG. 9, another embodiment (second embodiment) of the mower 9 will be described.

The mower 9 according to the second embodiment includes a retaining member 90 in addition to the configuration of the mower 9 according to the first embodiment. The retaining member 90 is mainly formed by a hook 91 and a ring 92.

The hook 91 is formed by bending a substantially rectangular plate material into a substantially L shape when seen in a front view. The hook 91 is fixed to a substantially upper end of the rubber sheet in an upward-oscillated and rolled-up state (see FIGS. 8B and 9) by an appropriate method.

One end of the ring 92 is fixed to a rubber belt 92a. The other end of the rubber belt 92a is fixed to the upper part of the mower deck 10.

In such a configuration, by hanging the ring 92 onto the hook 91 and retaining the hook 91 in a state that the hook is pulled leftward, the rubber sheet 40 can be retained in an upward-oscillated and rolled-up state.

As described above, the mower 9 according to the present embodiment further includes the retaining member 90 for retaining the rubber sheet 40 whose fixing by the fixing clips 80 is released in an upward-oscillated state.

With such a configuration, the rubber sheet 40 can be retained in a state that the rubber sheet 40 does not easily protrude to the side of the mower 9.

Figure 10:
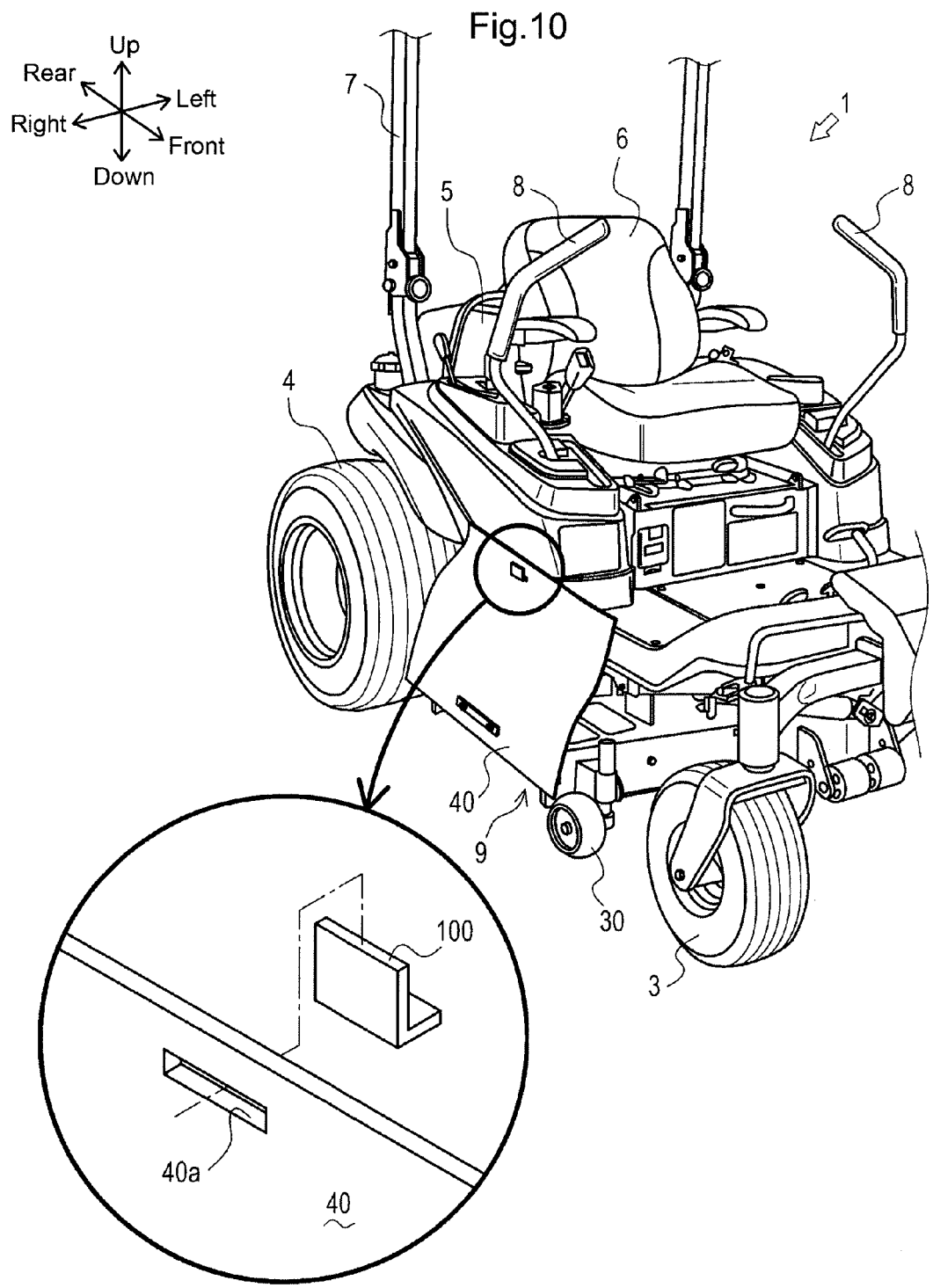
FIG. 10 is a perspective view showing a state that the rubber sheet oscillated upward is retained by a retaining member according to a third embodiment.

Hereinafter, with reference to FIG. 10, still another embodiment (third embodiment) of the mower 9 will be described.

The mower 9 according to the third embodiment includes a retaining member 100 in addition to the configuration of the mower 9 according to the first embodiment.

The retaining member 100 is formed by bending a substantially rectangular plate material into a substantially L shape when seen in a front view. The retaining member 100 is fixed to the grass mowing machine 1 (such as a fender) on the substantially upper side of the rubber sheet 40 in a state that a leading end thereof faces the upper side.

A hole 40a into which the retaining member 100 is insertable is formed in the vicinity of the upper end of the rubber sheet 40.

In such a configuration, the retaining member 100 is inserted into the hole 40a of the rubber sheet 40 oscillated upward. Thereby, the rubber sheet 40 can be hung from the retaining member 100, so that the rubber sheet 40 can be retained in an upward-oscillated state.

In such a way, by hanging the rubber sheet 40 onto the grass mowing machine 1, a space can be saved at the time of accommodating or conveying the grass mowing machine 1 while the mower 9 is attached to the grass mowing machine 1.

Hereinafter, with reference to FIGS. 11A and 11B, yet another embodiment (fourth embodiment) of the mower 9 will be described.

The mower 9 according to the fourth embodiment includes fixing members 110 instead of the fixing clips 80 of the mower 9 according to the first embodiment.

The fixing member 110 is formed by bending a substantially rectangular plate material into a substantially L shape when seen in a plan view. The fixing member 110 is fixed to the vicinity part of the front end of the front side plate 10c of the mower deck 10 in a state that a leading end thereof faces the left side. Another fixing member 110 is similarly provided in the vicinity of a front end of the rear side plate 10d of the mower deck 10.

A hole 40b into which the fixing member 110 is insertable is formed in the vicinity of the left end of the front end (downward-bent part) of the rubber sheet 40. Another hole 40b is similarly formed in the rear end of the rubber sheet 40.

In such a configuration, the fixing members 110 are inserted into the holes 40b of the rubber sheet 40 whose both front and rear ends are bent downward. Thereby, the rubber sheet 40 can be hung from the fixing members 110, so that the rubber sheet 40 can be retained in a bent state (see FIG. 6 together).

Figure 12A:
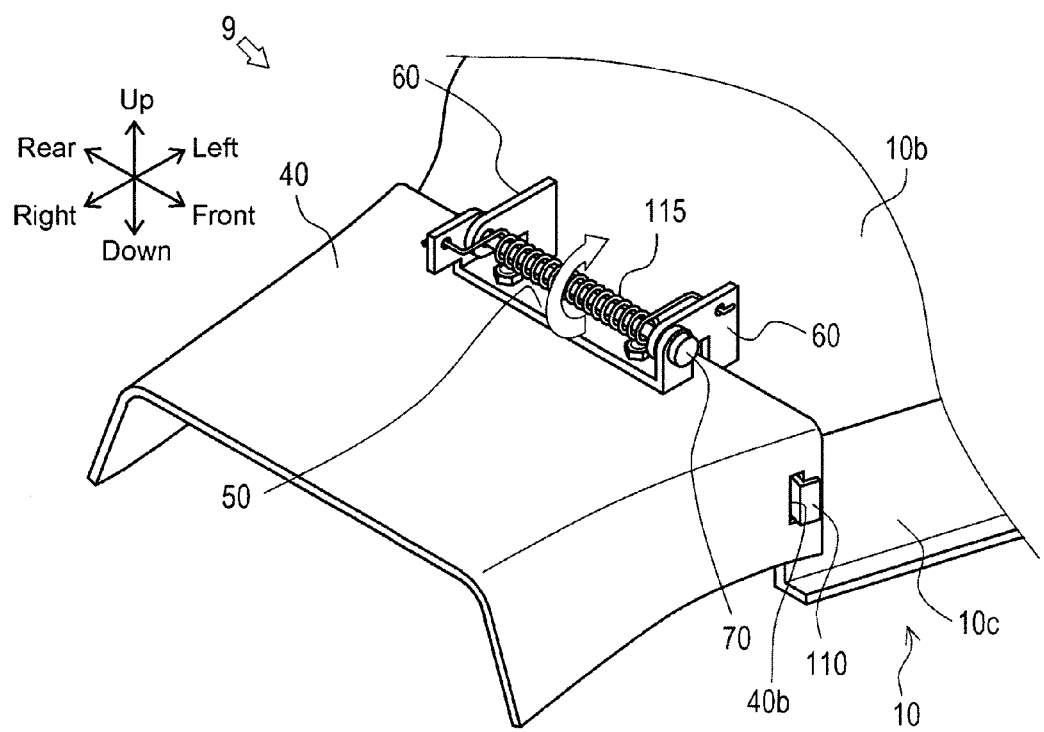
FIG. 12A is a perspective view showing a state that the rubber sheet is biased upward by a spring according to a fifth embodiment.
Figure 12B:
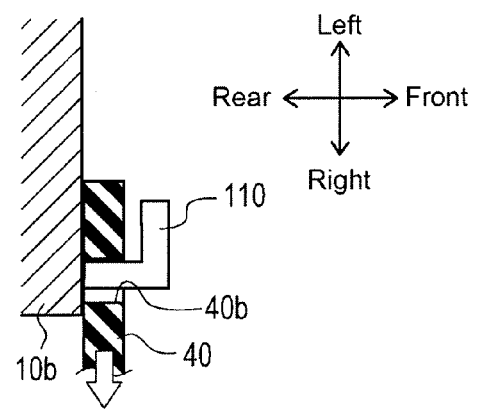
FIG. 12B is a partially sectional plan view showing a fixing member.

Hereinafter, with reference to FIGS. 12A and 12B, yet another embodiment (fifth embodiment) of the mower 9 will be described.

The mower 9 according to the fifth embodiment includes a spring 115 in addition to the configuration of the mower 9 according to the fourth embodiment.

The spring 115 is a torsional coil spring wound around the pivot shaft 70. One end (rear end) of the spring 115 is coupled to the rear end of the pivot frame 50, and the other end (front end) of the spring 115 is coupled to the support frame 60 arranged on the front side. The spring 115 always biases the pivot frame 50 so that the pivot frame is pivoted upward with respect to the support frame 60.

Figure 11A:
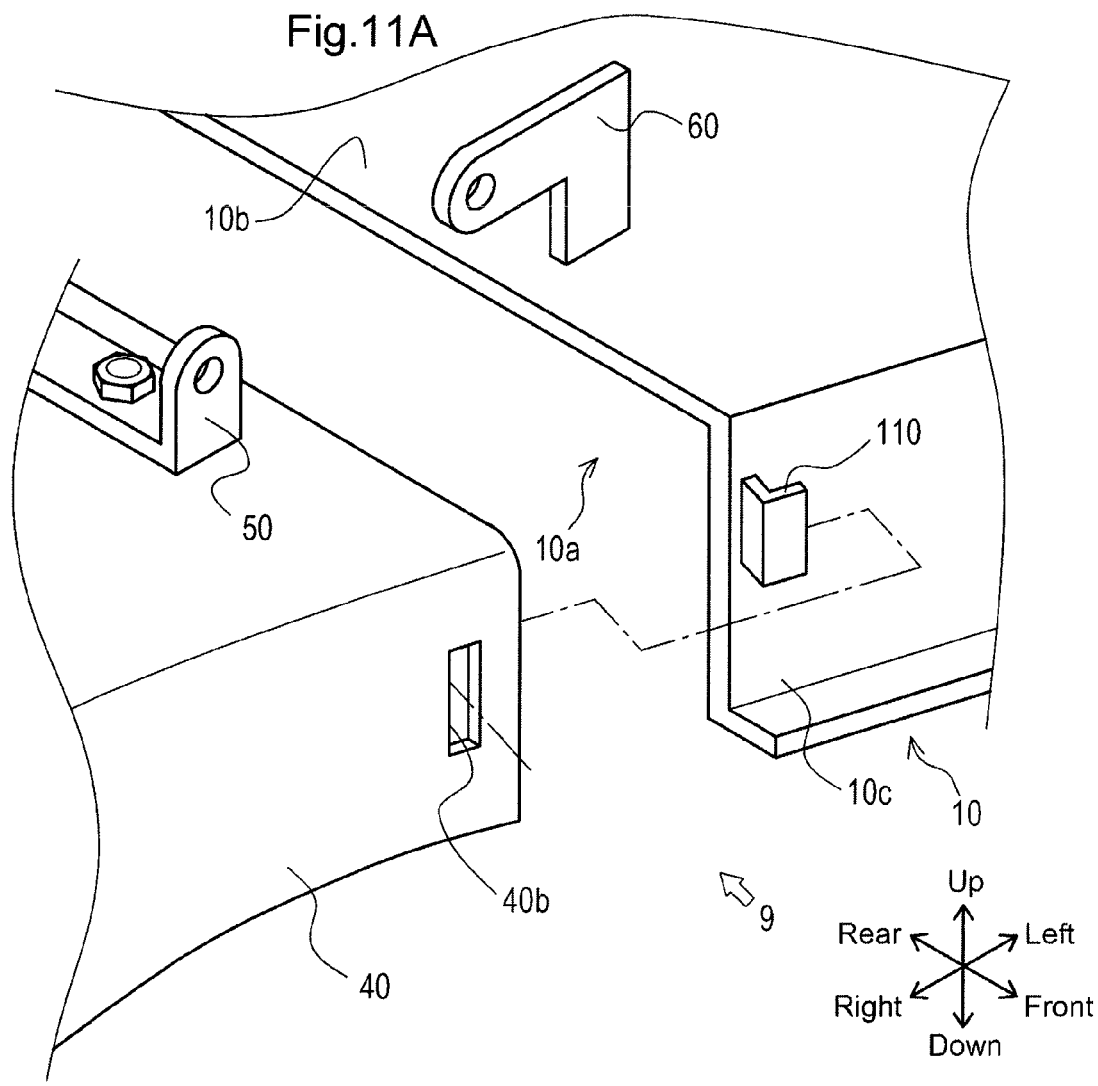
FIG. 11A is a perspective view showing a state that the rubber sheet is fixed by a fixing member according to a fourth embodiment.
Figure 11B:
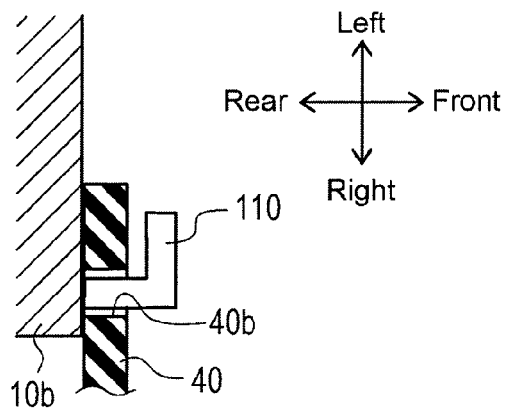
FIG. 11B is a partially sectional plan view showing the same state.

In such a configuration, the rubber sheet 40 is hung from the fixing members 110 as well as the fourth embodiment (see FIGS. 11A and 11B). Since the pivot frame 50 is biased by the spring 115 so as to be pivoted upward, the rubber sheet 40 is also biased so as to be pivoted upward via the pivot frame 50. Therefore, vicinity parts of the holes 40b of the rubber sheet 40 are biased rightward when seen in a plan view (see FIG. 12B). Thereby, the rubber sheet 40 is not easily drawn out from the fixing members 110, so that the rubber sheet 40 can be more reliably fixed.

In a case of pivoting the rubber sheet 40 upward and bringing into the accommodation state, since the rubber sheet 40 is biased upward by the spring 115, the worker can pivot the rubber sheet 40 upward with a light force. In such a way, workability at the time of pivoting the rubber sheet 40 upward can be improved.

It should be noted that such a spring 115 can be similarly provided in the mower 9 according other embodiments (the first to fourth embodiments described above and sixth and seventh embodiments described later).

Hereinafter, with reference to FIGS. 13A to 13C, yet another embodiment (sixth embodiment) of the mower 9 will be described.

The mower 9 according to the sixth embodiment includes fixing members 120 instead of the fixing members 110 of the mower 9 according to the fourth embodiment. The fixing member 120 mainly includes an engagement plate 121, a support plate 122, a movable plate 123, a pivot shaft 124, and a spring 125.

The engagement plate 121 is fixed to the vicinity part of the front end of the front side plate 10c of the mower deck 10 in a state that plate surfaces thereof face the left and right direction.

The support plate 122 is fixed to the vicinity part of the front end (on the left side of the engagement plate 121) of the front side plate 10c of the mower deck 10 in a state that plate surfaces thereof face the left and right direction.

The movable plate 123 is arranged on the front side of the engagement plate 121 and the support plate 122 in a state that plate surfaces thereof face the front and rear direction.

The pivot shaft 124 is inserted into a front end of the support plate 122 and a left end of the movable plate 123. Thereby, the pivot shaft 124 couples the movable plate 123 to the support plate 122 oscillatably (pivotably) in the front and rear direction.

The spring 125 is wound around the pivot shaft 124 and biases the movable plate 123 in one direction (clockwise when seen in a plan view). Thereby, unless the external force is applied, a right end of the movable plate 123 is retained in a state that the right end is pushed to a front end of the engagement plate 121.

In such a configuration, as shown in FIG. 13C, the movable plates 123 are pivoted anticlockwise when seen in a plan view against a bias force of the springs 125, and the engagement plates 121 are inserted into the holes 40*b* of the rubber sheet 40. After that, the movable plates 123 are pivoted clockwise when seen in a plan view again by the bias force of the springs 125, and the movable plates 123 are retained in a state that the movable plates are pushed to the engagement plates 121. In such a way, the rubber sheet 40 is hung from the engagement plates 121 and the rubber sheet 40 can be prevented from dropping off from the engagement plates 121 by the movable plates 123. Thereby, the rubber sheet 40 can be retained in a bent state (see FIG. 6 together).

Figure 14A:
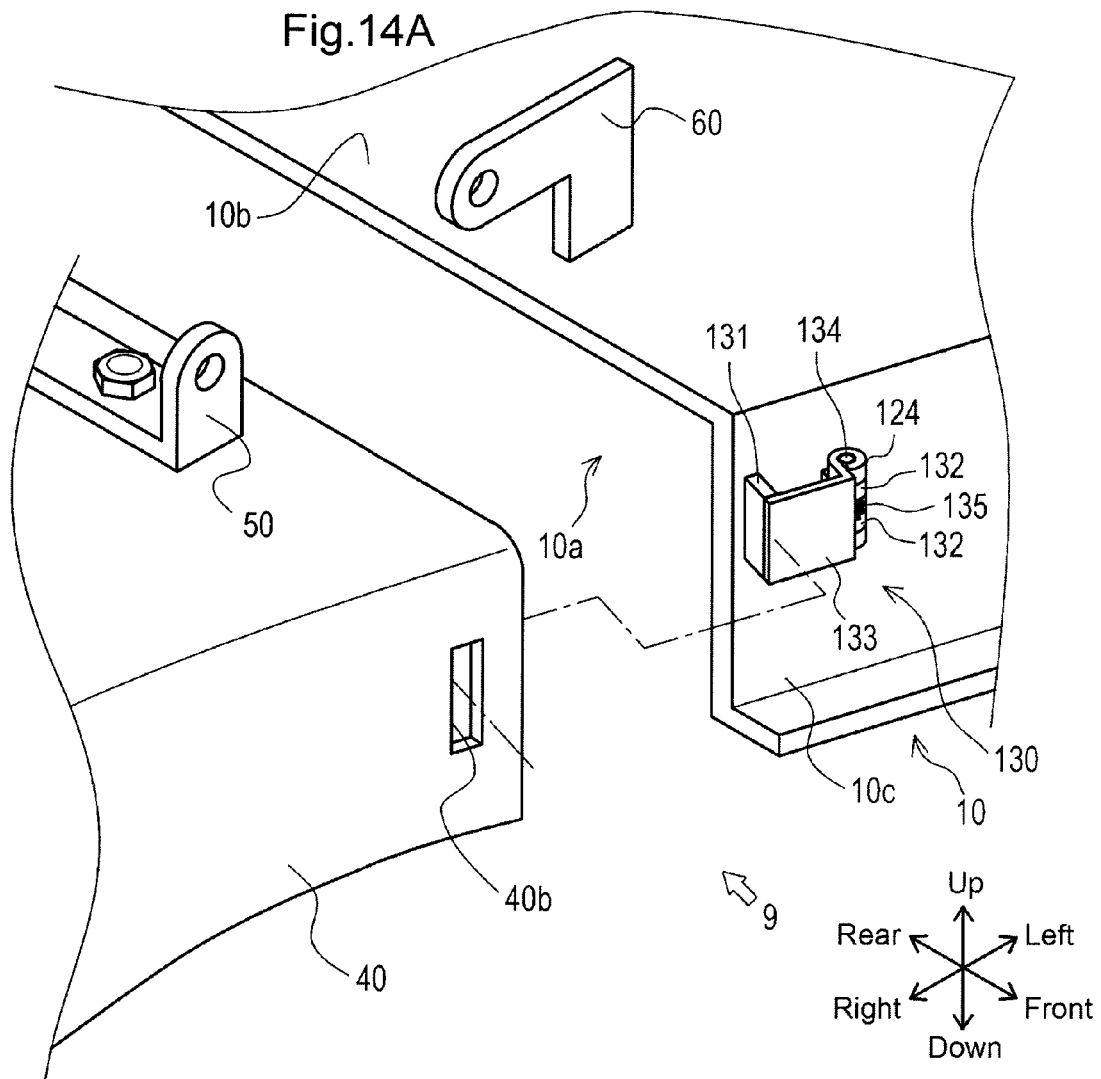
FIG. 14A is a perspective view showing a state that the rubber sheet is fixed by a fixing member according to a seventh embodiment.
Figure 14B:
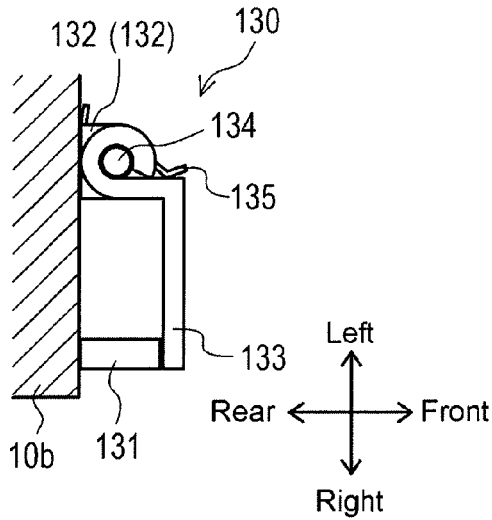
FIG. 14B is a partially sectional plan view showing the fixing member.

Hereinafter, with reference to FIGS. 14A to 14C, yet another embodiment (seventh embodiment) of the mower 9 will be described.

The mower 9 according to the seventh embodiment includes fixing members 130 instead of the fixing members 120 of the mower 9 according to the sixth embodiment. The fixing member 130 mainly includes an engagement plate 131, support plates 132, 132, a movable plate 133, a pivot shaft 134, and a spring 135.

The engagement plate 131 is fixed to the vicinity part of the front end of the front side plate 10*c* of the mower deck 10 in a state that plate surfaces thereof face the left and right direction.

The pair of upper and lower support plates 132, 132 is provided in a state that plate surfaces thereof face the up and down direction. The support plates 132, 132 are fixed to the vicinity part of the front end (on the left side of the engagement plate 131) of the front side plate 10*c* of the mower deck 10.

The movable plate 133 is formed by bending into a substantially L shape when seen in a plan view. The movable plate 133 has a base end extended in the front and rear direction, and a leading end extended rightward from a front end of the base end. The movable plate 133 is arranged on the front side of the engagement plate 131 and the support plates 132, 132.

The pivot shaft 134 is inserted into the support plates 132, 132 and the base end (rear end) of the movable plate 133. Thereby, the pivot shaft 134 couples the movable plate 133 to the support plates 132, 132 oscillatably (pivotably) in the front and rear direction.

The spring 135 is wound around the pivot shaft 134 and biases the movable plate 133 in one direction (clockwise when seen in a plan view). Thereby, unless the external force is applied, a right end of the movable plate 133 is retained in a state that the right end is pushed to a front end of the engagement plate 131.

Figure 14C:
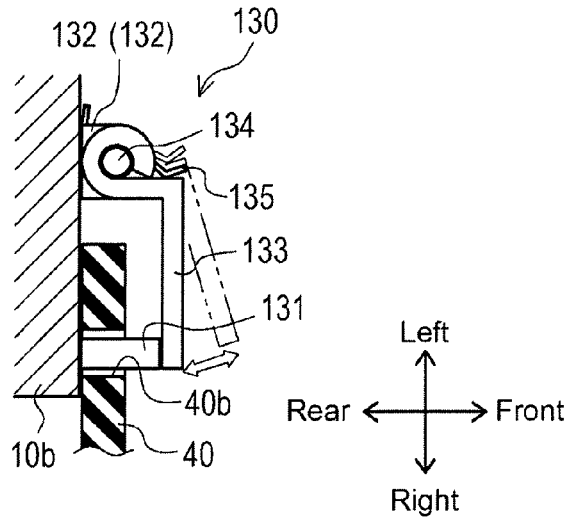
FIG. 14C is a partially sectional plan view showing the fixing member in a state that the rubber sheet is fixed.

In such a configuration, as shown in FIG. 14C, as well as the fixing members 120 according to the sixth embodiment (see FIGS. 13A to 13C), the rubber sheet 40 is hung from the engagement plates 131 and the rubber sheet 40 can be prevented from dropping off from the engagement plates 131 by the movable plates 133. Thereby, the rubber sheet 40 can be retained in a bent state (see FIG. 6 together).

It should be noted that although the mower 9 is provided in the grass mowing machine capable of independently driving the pair of left and right drive wheels 4, 4 (so-called zero-turn mower) in the above embodiments, the present invention is not limited to this. For example, the mower can be applied to various grass mowing machines such as a grass mowing machine in which a mower is arranged between front wheels and rear wheels (so-called mid-mount mower) and a grass mowing machine in which a mower is arranged on the front side of front wheels (so-called front mower).

In the above embodiments, the rotary blades 20, 20, . . . of the mower 9 are driven by the motive power transmitted from the engine 5 of the grass mowing machine 1. However, the present invention is not limited to this. That is, a drive source (such as a motor) may be separately provided in the mower 9 and the rotary blades may be driven by motive power from the drive source.

In the above embodiments, the rubber sheet 40 formed in a substantially rectangular shape when seen in a plan view is taken as an example of the guide member according to the present invention. However, the present invention is not limited to this. That is, the material and the shape of the guide member are not limited as long as the guide member is formed in a flexible flat plate shape.

In the above embodiments, the pivot frame 50, the support frames 60, and the pivot shaft 70 are taken as examples of the coupling assembly according to the present invention. However, the present invention is not limited to this. That is, the configuration of the coupling member is not limited as long as the rubber sheet 40 can be attached to the mower deck oscillatably in the up and down direction.

In the above embodiments, the rubber sheet 40 is attached to the mower deck simply oscillatably in the up and down direction with reference to the pivot frame 50, the support frames 60, and the pivot shaft 70. However, the present invention is not limited to this. For example, a bias member (such as a spring) for biasing the pivot frame 50 downward can be provided and the rubber sheet 40 can be always biased downward. Thereby, the rubber sheet 40 in the working state can be prevented from being brought upward.

In the above embodiments, the fixing clips 80, the fixing members 110, the fixing members 120, and the fixing members 130 are taken as examples of the fixing member according to the present invention. However, the present invention is not limited to this. That is, the configuration of the fixing member is not limited as long as the rubber sheet 40 can be fixed to the mower deck 10 in a state that the rubber sheet 40 is bent into a predetermined shape (shape capable of guiding the mowed grasses). For example, simply a fastening tool such as a bolt, a button, a hook-and-loop fastener, and the like can be used as the fixing member.

In the above embodiments, the retaining member 90 and the retaining member 100 are taken as examples of the retaining member according to the present invention. However, the present invention is not limited to this. That is, the configuration of the retaining member is not limited as long as the rubber sheet 40 can be retained in an upward-oscillated state.

What is claimed is:

1. A mower for discharging mowed grasses from a discharge port provided in a side part of a mower deck to an exterior of the mower deck, the mower comprising:
    a flexible guide member formed in a flat plate shape;
    a coupling assembly attaching the guide member to the mower deck for pivotal movement in an up and down direction in relation to the mower deck, the coupling assembly comprising a pivot frame fixed to the guide member and for movement with the guide member during said pivotal movement;
    the guide member being configured to assume the flat plate shape while fixed to the mower deck via the coupling assembly; and
    a fixing member for fixing the guide member to the mower deck in a state that the guide member is bent into a shape capable of guiding the mowed grasses discharged from the discharge port, the fixing member being separate from both the pivot frame and the guide member.

2. The mower according to claim 1, further comprising:
a retaining member for retaining the guide member whose fixing by the fixing member is released in an oscillated upward state of the guide member.

3. A grass mowing machine comprising the mower according to claim 2.

4. The mower according to claim 1, wherein:
the flexible guide member is configured to be moved from an accommodation state to a working state;
in the accommodation state, the discharge port is in an open position, but the flexible guide member is not fixed in the bent state capable of guiding the mowed grasses discharged from the discharge port; and
in the working state, the discharge port is in an open position, and the flexible guide member is fixed in the bent state capable of guiding the mowed grasses discharged from the discharge port.

5. The mower according to claim 1, wherein:
the flexible guide member is configured to be bent, while attached to the mower deck, from the flat plate shape to a working state; and
in the working state, the fixing member fixes the guide member in the bent state against an elastic biasing force of the guide member.

6. The mower according to claim 5, wherein:
when the flexible guide member does not fix the guide member in the working state, the flexible guide member is elastically biased to the flat plate shape.

7. The mower according to claim 1, wherein:
in the flat plate shape, the flexible guide member consists of only a single flat plate.

8. The mower according to claim 1, wherein:
in addition to the fixing member, the mower includes a second fixing member;
the flexible guide member is configured to be bent, while attached to the mower deck, from the flat plate shape to a working state;
in the working state, the guide member has a substantially tubular shape having an upper side, a pair of spaced-apart opposite sides, and an open bottom; and
the fixing member fixes one of the opposite sides of the guide member to the mower deck and the second fixing member fixes a second of the opposite sides of the guide member to the mower deck.

9. The mower according to claim 2, wherein:
in the oscillated-upward state of the guide member, the guide member is positioned away from the discharge port and the discharge port is open.

10. The mower according to claim 2, wherein:
in the oscillated-upward state of the guide member, an entirety of the guide member had been oscillated upwardly.

11. The mower according to claim 2, wherein:
in the oscillated-upward state of the guide member, the guide member is not fixed to the mower deck by means of any fixing member.

12. The mower according to claim 2, wherein:
in the oscillated-upward state of the guide member, the retaining member retains the guide member in the oscillated-upward state and against returning to the flat plate shape.

13. A mower for discharging mowed grasses, said mower comprising:
a mower deck having a side part provided with a mowed-grasses discharge port provided to discharge the mowed grasses to an exterior of the mower deck;
an elastically deformable guide member configured to assume a non-biased flat shape;
a coupling assembly connecting the guide member to the mower deck to pivot in relation to the mower deck in an up and down direction during the movement between a working state and an accommodation state, the coupling assembly comprising a pivot frame fixed to the guide member for movement with the guide member during the movement between the working and accommodation states;
in the working state, the guide member being deformed into a substantially tubular shape having an upper side and two spaced-apart sides to guide the mowed grasses from the discharge port;
in the accommodation state, the guide member extends above the discharge port, thereby leaving the discharge port open;
at least one fixing member configured to fix the guide member to retain the guide member in the working state, the fixing member being separate from both the pivot frame and the guide member.

14. The mower according to claim 13, further comprising:
at least one retaining member configured to retain the guide member in the accommodation state.

15. The mower according to claim 13, wherein:
the fixing member is fixed to the mower deck.

* * * * *